United States Patent
Eitel (12)

(10) Patent No.: US 6,238,017 B1
(45) Date of Patent: May 29, 2001

(54) ADVANCED MOTORCYCLE CHASSIS AND BRAKING SYSTEM

(76) Inventor: Frederick G. Eitel, 3579 William St., Lake Park, FL (US) 33403

(*) Notice: Subject to any disclaimer, the term of this patent is extended or adjusted under 35 U.S.C. 154(b) by 0 days.

(21) Appl. No.: 09/164,501

(22) Filed: Oct. 1, 1998

Related U.S. Application Data (60) Provisional application No. 60/060,939, filed on Oct. 3, 1997.

(51) Int. Cl.$^7$ ............................. B60T 8/32; B60T 65/853; B62L 3/08
(52) U.S. Cl. ..................... 303/137; 188/71.6; 188/344; 188/349; 188/264 D; 188/264 P; 303/9.64; 303/166; 303/191; 303/DIG. 4; 303/186; 303/177; 303/181; 303/113.5
(58) Field of Search .................. 188/71.6, 24.11–24.22, 188/264 CC, 264 D, 264 P, 344, 274, 349, 195; 185/264 R; 301/6.3; 303/9.64, 9.67, 24.1, 9.68, 9.69, 186, 137, 113.5, DIG. 3, DIG. 4, 166–199; 180/219; 192/113.31, 113.3, 70.12; 165/41, 104.26, 80.4, 86, 278

(56) References Cited

U.S. PATENT DOCUMENTS

| | | |
|---|---|---|
| 1,952,967 | 3/1934 | Boughton . |
| 2,618,756 | 11/1952 | Fechheimer . |

(List continued on next page.)

FOREIGN PATENT DOCUMENTS

| | | | |
|---|---|---|---|
| 2540907 | * | 4/1976 | (DE) . |
| 3223405 | * | 1/1986 | (DE) . |
| 55-156755 | * | 12/1980 | (JP) . |
| 57-157841 | * | 9/1982 | (JP) . |
| 60-132139 | * | 7/1985 | (JP) . |
| 62-278328 | * | 12/1987 | (JP) . |
| 471951 | * | 3/1992 | (JP) . |
| 4163154 | * | 5/1992 | (JP) . |
| 5187468 | * | 7/1993 | (JP) . |
| 5215160 | * | 8/1993 | (JP) . |
| 5240278 | * | 9/1993 | (JP) . |
| 674271 | * | 3/1994 | (JP) . |
| 681865 | * | 3/1994 | (JP) . |
| 6122363 | * | 5/1994 | (JP) . |
| 849739 | * | 2/1996 | (JP) . |
| 8177913 | * | 7/1996 | (JP) . |
| 953671 | * | 2/1997 | (JP) . |
| 9133167 | * | 5/1997 | (JP) . |

*Primary Examiner*—Douglas C. Butler
(74) *Attorney, Agent, or Firm*—Malin, Haley & DiMaggio, P.A.

(57) ABSTRACT

A motorcycle chassis embodies novel techniques, geometries, and configurations to provide enhanced performance, including new techniques to enhance braking performance. A first feature facilitates the application of braking force to each wheel in proportion to its traction capability. Maximum deceleration rates are provided prior to wheel lockup. A second feature applies liquid cooling to a brake disk. Liquid cooling eliminates brake fade caused by overheating of the brake pad material. Aerodynamic control features in concert with unique component arrangement better protect the rider from wind forces and also reduce aerodynamic drag. Narrow steering bars enclosed by body-work and deep leg notches in the fairing contour largely remove rider induced air flow trips. The leg notches serve to brace the rider during deceleration, unloading his wrists from much of the braking force. An exhaust system routed over the engine permits a totally smooth body undercarriage to reduce aerodynamic drag. Through-flow ducting to a rear mounted radiator and discharge of cooling air to a low pressure region aft eliminates the need for drag inducing side vents in the fairing. The arrangement also directs heated (radiator discharge) air away from the rider. A wide non-separating tail section of porous exit area design promotes near laminar discharge of through-flow air, reducing the wake turbulence (induced) drag.

34 Claims, 10 Drawing Sheets

U.S. PATENT DOCUMENTS

| | | |
|---|---|---|
| 3,592,297 * | 7/1971 | Leffert .................................. 188/71.6 |
| 3,702,207 * | 11/1972 | Armstrong .......................... 303/9.69 |
| 3,825,308 * | 7/1974 | Kasselmann et al. ............... 188/349 |
| 3,839,868 * | 10/1974 | Watanabe ............................. 188/349 |
| 3,850,267 * | 11/1974 | Odier ................................... 188/71.6 |
| 3,920,281 * | 11/1975 | Brun . |
| 3,927,913 * | 12/1975 | Rockwell ............................. 303/9.67 |
| 3,944,292 * | 3/1976 | Doi et al. ............................. 303/9.67 |
| 3,953,082 * | 4/1976 | Smith ................................... 303/24.1 |
| 4,013,148 | 3/1977 | Kobelt . |
| 4,035,032 * | 7/1977 | Bertolasi ............................. 303/137 |
| 4,093,313 * | 6/1978 | Burckhardt .......................... 303/9.69 |
| 4,130,315 | 12/1978 | Shields . |
| 4,141,567 | 2/1979 | Scott . |
| 4,274,518 * | 6/1981 | Berisch ............................... 303/9.71 |
| 4,312,543 * | 1/1982 | Kubota ................................ 303/24.1 |
| 4,358,163 * | 11/1982 | Young . |
| 4,391,352 * | 7/1983 | Brown . |
| 4,398,741 | 8/1983 | Hiramatsu . |
| 4,411,333 | 10/1983 | Bothwell . |
| 4,465,322 * | 8/1984 | Hayashi .............................. 303/9.64 |
| 4,494,800 | 1/1985 | Hayashi . |
| 4,526,249 | 7/1985 | Parker . |
| 4,626,038 | 12/1986 | Hayashi et al. . |
| 4,650,021 | 3/1987 | Matsuda et al. . |
| 4,650,022 | 3/1987 | Sato et al. . |
| 4,650,023 | 3/1987 | Matsuda et al. . |
| 4,655,311 | 4/1987 | Matsuda et al. . |
| 4,664,214 | 5/1987 | Matsuda et al. . |
| 4,709,774 | 12/1987 | Saito et al. . |
| 4,756,379 | 7/1988 | Kawano et al. . |
| 4,770,460 | 9/1988 | Miura et al. . |
| 4,776,422 | 10/1988 | Sakuma . |
| 4,794,998 | 1/1989 | Iwai et al. . |
| 4,813,511 | 3/1989 | Yamaguchi et al. . |
| 4,815,573 | 3/1989 | Miyata . |
| 4,828,069 | 5/1989 | Hatsuyama . |
| 4,830,134 | 5/1989 | Hashimoto . |
| 4,883,149 | 11/1989 | Campbell et al. . |
| 4,951,791 | 8/1990 | Belil Creixell . |
| 4,964,484 | 10/1990 | Buell . |
| 4,989,922 * | 2/1991 | Pickenhahn et al. ................ 303/137 |
| 5,003,829 | 4/1991 | DeConti et al. . |
| 5,014,808 | 5/1991 | Savard et al. . |
| 5,067,580 | 11/1991 | Parker . |
| 5,133,223 | 7/1992 | Morri . |
| 5,156,231 | 10/1992 | Trema . |
| 5,219,211 * | 6/1993 | Tsuchida et al. .................... 303/9.64 |
| 5,257,856 * | 11/1993 | Ota et al. ............................. 188/195 |
| 5,273,346 * | 12/1993 | Tsuchida et al. .................. 303/113.5 |
| 5,358,077 | 10/1994 | DeConti . |
| 5,361,864 | 11/1994 | Tanaka . |
| 5,372,408 * | 12/1994 | Tsuchida et al. .................... 303/9.64 |
| 5,378,053 * | 1/1995 | Patient et al. . |
| 5,417,305 | 5/1995 | Parker . |
| 5,419,625 | 5/1995 | Iwase et al. . |
| 5,460,434 * | 10/1995 | Micke et al. . |
| 5,490,573 | 2/1996 | Hagiwara et al. . |
| 5,501,511 * | 3/1996 | Wagner .............................. 303/113.5 |
| 5,503,244 | 4/1996 | Beirlein . |
| 5,544,946 * | 8/1996 | Toyoda et al. ....................... 303/9.64 |
| 5,620,237 * | 4/1997 | Iwashita et al. ..................... 303/9.64 |

* cited by examiner

Fig. 1

Vehicle Weight=530lb
Front/Rear Weight Distribution=45/55%
Wheelbase=60in.
C.G. Height=24in.
Frontal Area=5.79sq.ft.
Drag Coefficient=0.04
Frontal Area Centroid Height=27in.

ADVANCED MOTORCYCLE CHASSIS AND BRAKING SYSTEM

CROSS-REFERENCE TO RELATED APPLICATIONS

This application claims the benefit of U.S. Provisional Application No. 60/060,939, filed Oct. 3, 1997.

STATEMENT REGARDING FEDERALLY SPONSORED RESEARCH OR DEVELOPMENT

BACKGROUND OF THE INVENTION

1. Field of the Invention

This invention relates generally to the field of motorcycles, and in particular, to a motorcycle chassis which embodies novel techniques, geometries and configurations in order to enhance motorcycle performance, and particularly in the area of braking performance.

2. Description of Related Art

Modern road going motorcycles are characterized by mostly evolutionary methodology and arrangements that have developed over the past forty-five years. A number of terms have been used and applied over the years of this evolution in the motorcycle art which are used in describing the related art and the inventive arrangements taught herein.

The following list of terms and their definitions will facilitate understanding the description of the invention:

An accumulator is a vessel containing compressed gas behind a piston or diaphragm. Hydraulic fluid can enter the vessel on one side of the piston or diaphragm without mixing with the gas. Gas and fluid pressure vary with changes in contained fluid volume.

Area moment of inertia is a structural property used to calculate bending stiffness and stress, a function of incremental area and the radius from its bending axis.

Bank is the slope or rotation about the axis of flight. Bank angle for a motorcycle is the angle between the tire center plane and a vertical plane through the tire contact patches.

Bump/steer is a term used to describe the tendency of a vehicle to deviate from a steered path when the suspension is suddenly compressed. Bump/steer results from interaction between steering linkage and suspension linkage, often representing design compromise and/or poor engineering.

Carbon/carbon is a composite of graphite fibers and carbon matrix, noted for its low mass density and high conductivity.

Center hub steering is motorcycle jargon that indicates one or more steering pivots located within the tire cross-section on its center plane.

The center of gravity (CG) is the apparent center point of a distributed mass. No rotation will occur in response to forces through this point of balance.

A centroid is the center of cross-sectional area.

Couple is two equal and opposite forces separated by a distance that produces (or resists) a moment.

Damping is the conversion of energy associated with mass and velocity into heat. Controlled fluid resistance or mechanical friction devices are generally used to dampen the unwanted vibrational energy associated with vertical wheel motion on vehicles.

Dive is a sudden descent. Used herein, dive refers to the tendency of a vehicle to pitch forward in response to braking forces, compressing the front suspension.

Dynamic refers to motion or laws of motion, translation and/or rotation.

Fairing generally refers to partial streamlining. Used herein, fairing refers specifically to plastic or fiberglass bodywork that comprises the complete streamlining shell for the motorcycle.

Inertia is general term for the tendency of matter to remain at rest, or to keep moving in the same direction unless acted on by a force. Inertia and mass are identical terms for linear acceleration.

Mass moment of inertia is a dynamic property which defines the resistance to rotation of a solid body about a center, a function of incremental weight in pounds, and the radius in inches from rotation axis.

Moment is the product of force times the lever arm length over which it acts.

Monocoque is a lightweight structural technique originating in the aircraft industry. Loads are carried in a stressed skin, forming the outside of the structure. The skin must form a closed box to form a stiff unit.

An orifice is a hole or reduced flow area sized to reduce flow rate or cause pressure loss at a given flow rate in hydraulic systems.

Pack down refers to the incomplete rebound of a suspension damping member, which reduce available travel for the next damping cycle.

Progressive rate generally refers to a non-linear spring rate. Ordinary springs exhibit compression distance proportional to force. Progressive wound springs require ever increasing force to produce an incremental compression.

Rising rate generally describes a suspension which produces an apparent progressive rate to wheel motion. In motorcycle jargon, a rising rate suspension refers to mechanical linkage that produces the progressive characteristic with linear springs.

A space frame is a three dimensional light-weight structure composed of tubes or solid bars that act primarily in tension and/or compression.

Squat is the tendency for a vehicle to crouch over its rear wheel in response to acceleration forces, compressing the rear suspension.

A stoppie is a reverse wheelie where the rear wheel lifts off the pavement. In this case, the deceleration moment overcomes the gravity moment.

A strut is a device which supports vehicle weight and allows compression motion, usually a shock absorber surrounded by a coil spring. Its use herein refers to a hydraulic cylinder which is pressurized from a remote accumulator.

Trail is a term which describes steering geometry. The trail is the distance the tire contact patch follows the steering axis at ground level, usually 3.0 to 5.0 inches. Less trail gives more responsive steering, but reduces stability.

A truss is a framework of tubes or struts for structural support. A space frame is a type of truss. The words space frame and truss are used interchangeably herein to indicate space frame structure.

A wheelie refers to the condition of a motorcycle accelerating with the front wheel elevated from the pavement. During a wheelie, the acceleration moment overcomes the gravity moment, achieving 100% weight transfer to the rear wheel.

In heretofore motorcycle construction, frames are primarily constructed of steel or aluminum. The tubular type frame construction utilizes steel members above and below the engine, terminating at a steering stem in front, and swing arm pivot at the rear. Multitube space frame structures are sometimes used for increased stiffness and lighter weight, most commonly with a single cylinder or 90 degree V-twin engines which offer less obstruction to the volume requirement imposed by such a structure.

Recent efforts have concentrated on aluminum "perimeter" frames. These use larger section members that surround the sides of the engine in a wide stance. They provide somewhat better torsional stiffness, a more direct load path between steering stem and swing arm pivot, and open access to the top and bottom of the engine.

Motorcycle steering is achieved by the use of handle bars attached directly to the steered member. Paired telescopic struts form a fork supporting the front wheel and serve double duty as the steered member and as the front suspension. Static friction in fork bushings and seals resists smooth action over bumps during heavy braking. Also, the telescopic fork arrangement, by virtue of it's length and slenderness, is relatively flexible in its resistance to brake and suspension loads, a low stiffness component in the structural chassis system. Chassis flexibility is an undesirable parameter in the search for crisp, responsive handling and stability. Moreover, fork legs and springs contribute to mass moment of inertia about the steering axis. The inertia resists rapid steering motions, contributing to rider fatigue.

Another characteristic of telescopic fork geometry is front suspension dive under hard braking. This is caused partially by weight transfer, a function of CG height, wheelbase and vehicle mass. Dive is exaggerated with the telescopic arrangement due to the necessary caster angle of the fork and steering stem. A braking force component applied along the spring/slider axis of the fork, approximately 24 degrees from vertical, results in additional compression of the front suspension, loss of ride height and (sometimes) bottoming of the suspension. Dive is accompanied by a reduction in steering caster angle and therefore stability.

To combat these difficulties, double leading link front suspension has been reborn and modernized in several recent examples such as Elf, Radd-Yamaha, Bimota and others. MacPherson types (single link/telescopic strut) have also emerged, the most successful by BMW. Most of these reduce the dive tendency and some apply anti-dive geometry to a limited degree. Steering friction increase is a practical issue with the latter types, especially under brake loads, due to a use of spherical plain bearings in the system. The spherical plain bearings are used in order to accommodate compound (steering and suspension) angular motions.

Motorcycle cornering is effected by first banking to an angle that achieves a centrifugal (radial) moment about the tire contact axis equal to the gravity (vertical) moment, at the desired cornering radius. The moment balance is maintained throughout the corner by the rider making small balance and steering corrections. With properly designed steering geometry, the motorcycle will sustain bank angle with little rider effort. The initial roll-in can be executed by rider weight shift during leisurely transition from vertical to banked.

For rapid directional change, as required in racing, the "counter-steer" technique is utilized. Counter-steer involves turning the steering member quickly in the direction opposite to the direction of turn until the desired bank angle is achieved, then back to a neutral position. Counter-steer places the front tire contact patch outboard of the vehicle CG while motion of the CG is resisted by its own inertia, producing bank angle. The ensuing gravity (vertical) moment assists the roll-in. Because the counter-steer maneuver is resisted by the entire rotational inertia of the laden vehicle mass, a rider's strength and stamina are taxed by close consecutive course bends at speed.

The design of road racing motorcycles emphasizes light weight and short wheel base to assist counter-steer for better maneuverability. Both parameters compromise straight-line stability. Reduction in wheel base increases weight transfer during hard acceleration or braking. This is evident in wheelies and stoppies, phenomena which require exceptional rider skill to deal with.

Motorcycle braking is almost always independent, front and rear wheel systems separately applied by hand and foot. Braking effectiveness, therefore is largely a function of rider sense and skill in the appropriate application of braking force to each wheel, short of wheel lockup. Anti-lock brake systems are available in some makes and models, but these systems reduce the available deceleration rate, especially on dry pavement. This is due to intermittent braking (interruption) when a wheel threatens to lock. A skilled rider can often slow or stop in a shorter distance without the anti-lock feature.

Air cooling of brakes is universal in motorcycles. Disk brakes are conventional, made of stainless steel, iron, or carbon-carbon material. Carbon-carbon is a light weight but costly material with higher temperature capability than the others. The disadvantage of carbon-carbon is frictional characteristics that vary widely over its use temperature. As disk temperature rises, stopping power increases. Much reduced stopping power is available when cold, however, and some racing organizations have ruled against the use of carbon-carbon brakes for safety reasons.

Liquid cooling of brakes has not found application in motorcycles because of cost, weight, physical size and packaging constraints, and safety concerns. Coolant must be well contained to prevent wetting the tires. Heated liquid and/or steam discharge must not be allowed proximity to the rider to prevent potential injury. However, liquid cooled brakes offer performance advantages over conventional air cooled brakes as fully described hereinbelow.

Suspension systems generally use coil springs. Sport and racing machines often employ progressive springs or rising rate spring loading geometry for tighter control of wheel travel. Damping is hydraulic, usually with adjustable (settable) damping rates. Damping force follows sinusoidal character through the wheel stroke excursion, with more rebound damping than in compression. Fixed hydraulic orifices result in instant damping force proportional to the square of stroke velocity. Insufficient damping allows bouncing to continue. Too much rebound damping causes the suspension to pack down, the incomplete rebound reducing available travel for the next cycle. Rebound damping usually employs a fluid orifice ideally sized for critical damping rate. Compression damping, however, is reduced by the addition of a pressure relief valve in parallel with a fixed orifice. This prevents excess damping force in response to extreme pavement amplitude (bumps or pot holes), allowing more suspension travel and a softer ride.

The tuning of shock absorbers is a trial and error process to find the best perceived adjustment for a set of conditions, type of riding, and or race course. Optimum damping applies only to a particular series of pavement perturbations and vehicle speed with this type of system.

Aerodynamic fairing bodywork is common to modern sport and racing motorcycles. By convention and or racing rules the fairing extends from the front axle to rear tire trailing edge. The rider is completely exposed from the side and rear view, but can be nearly hidden behind the fairing when viewed from the front. Wheels are also exposed in the side view. Wheels are open spoked structures, with tires partially covered by fenders with air cooled disk brakes to the sides on front wheels. Engine exhaust pipes run below the engine and exit through mufflers at the rear, located to the side and high for cornering clearance. The exhaust pipes are sometimes partially enclosed by the fairing. The riders hands extend beyond the fairing width, exposed to accommodate handlebar width sufficient for adequate steering leverage. Liquid cooled engines require a radiator, generally placed immediately in front of the engine. A forward facing aperture in the fairing ducts most of the through-flow air into the radiator. The warm air exits around the engine and out through side vents in the fairing forward of the riders legs, some continuing through to the rear wheel well.

The primary measurement of motorcycle performance for those skilled in the art would be achievable lap time on a closed racing circuit. Useful parameters of improved performance include: steering response and maneuverability; stability in motion; road holding/cornering ability; aerodynamic efficiency/rider wind protection; and, deceleration rate/stopping ability. All of these parameters need to be addressed to move the evolutionary development of motorcycles ahead in an uncharacteristically large step forward.

BRIEF SUMMARY OF THE INVENTION

The parameters discussed above are addressed by various aspects of the present invention, which is a totally new motorcycle chassis. Specifically, disclosed hereinbelow are new techniques to enhance braking performance.

Numerous motorcycle improvements taught herein include, but are not limited to, the following:
1. Improved vehicle braking performance, including:
   a.) a passive closed loop system to distribute braking torque between front and rear wheels in proportion to dynamic wheel loading normal to the pavement;
   b.) a total-loss liquid cooling system for brakes; and,
   c.) a closed recirculating liquid cooled brake system.
2. Improved motorcycle bodywork, including:
   a.) an arrangement of components to improve cooling flow management, reduce aerodynamic drag, and improve rider protection from wind forces and warmed cooling air; and,
   b.) the incorporation of rider "knee notches" for support against braking, protection from falls, and aerodynamic fairing of the rider.

The present invention provides the application of braking force to each wheel in proportion to its traction capability. Maximium deceleration rate can be achieved prior to wheel lockup with use of the parent invention. A second aspect applies liquid cooling to a brake disk. Liquid cooling eliminates brake fade caused by overheating of the brake pad material.

Vehicle weight loading distribution varies in response to axial deceleration and aerodynamic pressure loading. The braking system of the present invention senses the vehicle weight loading distribution and proportionately modifies braking effort applied to each wheel. The rider no longer need to determine how much pressure to apply to independent brake controls for a given braking situation.

The liquid cooling is accomplished by a total-loss system in which the liquid surges into chambers adjacent the brake disks where the liquid is heated to boiling by the disks. The steam generated is exhausted through a vent hose. Alternately, a recirculating system can be used in which the liquid is heated during circulation through passages in the brake disk. The liquid is intentionally kept below the boiling point. A radiator cools the liquid which then continues recirculation through the system by a pump.

In addition to the improvements in braking, aerodynamic control features in concert with unique component arrangement better protect the rider from wind forces and also reduce aerodynamic drag. Narrow steering bars enclosed by bodywork and deep leg notches in the fairing contour largely remove rider induced air flow trips. The improved braking system may cause increased deceleration forces during braking. The leg notches in the fairing contour further serve to brace the rider during braking deceleration, unloading the rider's wrists from much of the braking force.

The exhaust system can be routed over the engine permitting a totally smooth body undercarriage to reduce aerodynamic drag. Through-flow ducting to a rear mounted radiator and discharge of cooling air to a low pressure region aft eliminates the need for drag inducing side vents in the fairing. The arrangement also directs heated (radiator discharge) air away from the rider. A wide non-separating tail section of porous exit area design promotes near laminar discharge of through-flow air, reducing the wake turbulence (induced) drag.

Accordingly, it is an object of the present invention to provide a closed-loop proportional braking system in which front to rear brake line pressure is continuously altered during braking in proportion to wheel loading against the pavement as determined by deceleration rate.

It is a further object of the present invention to provide a closed-loop proportional braking system in which front to rear brake line pressure is continuously altered during braking in proportion to wheel loading against the pavement as determined by deceleration rate and aerodynamic drag.

It is another object of the present invention to provide a total-loss liquid cooled brake system that utilizes a disk cooling unit that directly cools at least one brake disk surface and that directs vaporized coolant away from the rider.

It is yet another object of the present invention to provide a total-loss liquid cooled brake system that utilizes a disk cooling unit that directly cools at least one brake disk surface and includes a condensate catch tank for return of the coolant to a reservoir.

It is still another object of the present invention to provide a closed-loop recirculating liquid cooled brake system that utilizes a disk having at least one passage for cooling liquid to flow through to remove heat from the disk to an external radiator and pump.

It is a further object of the present invention to provide bodywork or fairings configured to support the rider against braking deceleration forces, which includes leg notches that also protect a rider's legs from a fall and reduces aerodynamic drag.

In accordance with these and other objects which will become apparent hereinafter, the instant invention will now be described with particular reference to the accompanying drawings.

DETAILED DESCRIPTION OF THE INVENTION

The innovative and advanced nature of the braking system of the present invention includes proportional braking, liquid cooling, and bodywork or fairing. The bodywork helps the rider better control increased deceleration forces while simultaneously reducing aerodynamic drag.

Figure 1:
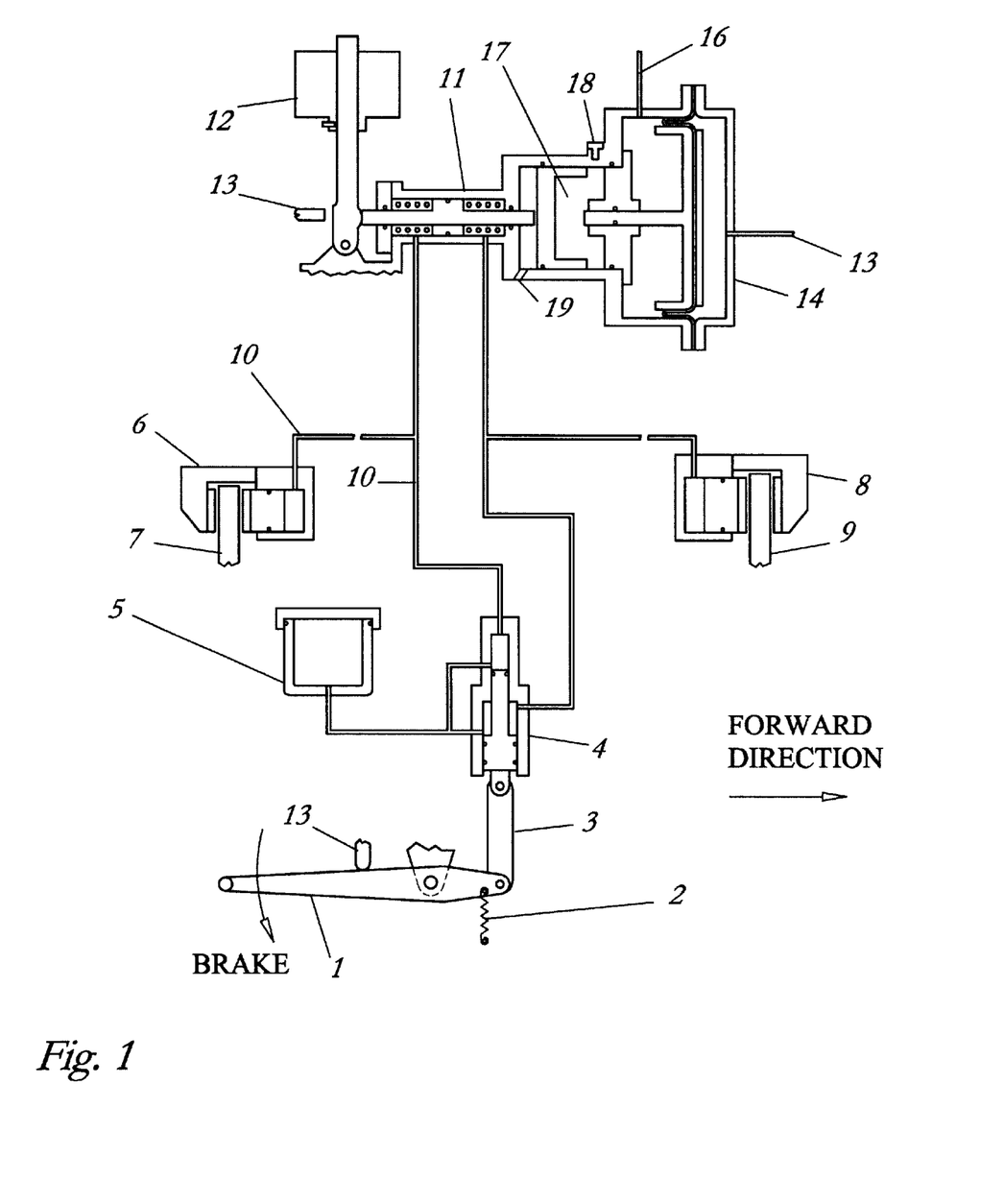
FIG. 1 is a diagrammatic view of the brake system of the present invention.

Referring to FIG. 1, the motorcycle braking system of the present invention can be utilized with conventional hydraulic actuated disk brakes. Brake disks are contained within the wheel cross-section and brake calipers are anchored to the respective upright member. FIG. 1 illustrates, for one embodiment of the present invention, the distribution of braking torque between front and rear wheels being actively controlled in proportion to dynamic normal wheel loading against the road surface. The system includes the following components.

Brake lever 1, having retract spring 2 and a limit stop 13, is connected by link 3 to dual master cylinder 4. Brake fluid reservoir 5 is connected to dual master cylinder 4, and may include a vent 19. Rear brake caliper and pads 6 act upon rear brake disk rotor 7 to provide rear wheel braking. Front brake caliper and pads 8 act upon front brake disk rotor 9 to provide front wheel braking. Hydraulic lines 10 provide fluid connection between components.

Brake pressure proportioning valve 11 distributes hydraulic pressure appropriately to the rear 6 and front 8 calipers and pads. Brake pressure proportioning valve 11 is connected to deceleration servo mechanism 12, which may include a limit stop 13. Brake pressure proportioning valve 11 may also be connected to air velocity servo mechanism 14. Air velocity servo mechanism 14 includes dynamic high pressure hose 15 and dynamic low pressure hose 16. Air velocity servo mechanism 14 also includes a hydraulic intensifier section 17, fluid fill port 18, and a vent 19.

A lockout valve 101 is inserted in brake lines 10 in a fashion to isolate the brake pressure proportioning valve 11 prior to application of brake pressure. This prevents back flow of brake fluid through fill ports in the master cylinder 4. Application of brake lines 1 closes said ports and simultaneously shuttles the poiston in lockou valve 101 (left) to open brake lines to proportioning valve 11. When brake pressure is removed, a spring in lockout valve 101 returns it to the closed position.

Figure 2:
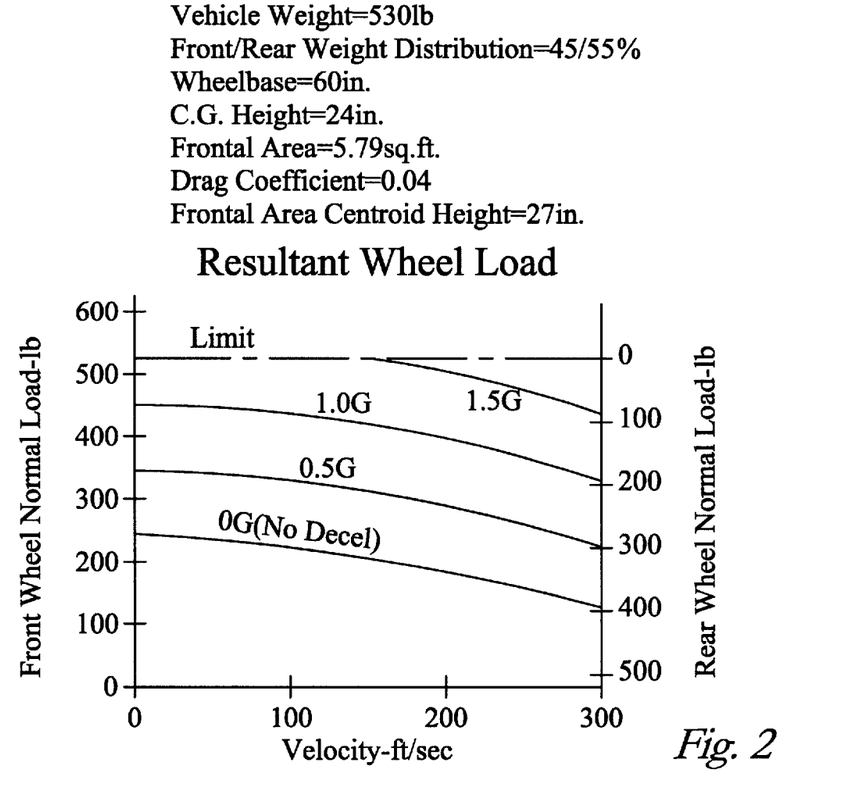
FIG. 2 is a graph illustrating load (vehicle weight) distribution between wheels as it varies in response to axial deceleration "g" force and aerodynamic pressure loading.
Figure 3:
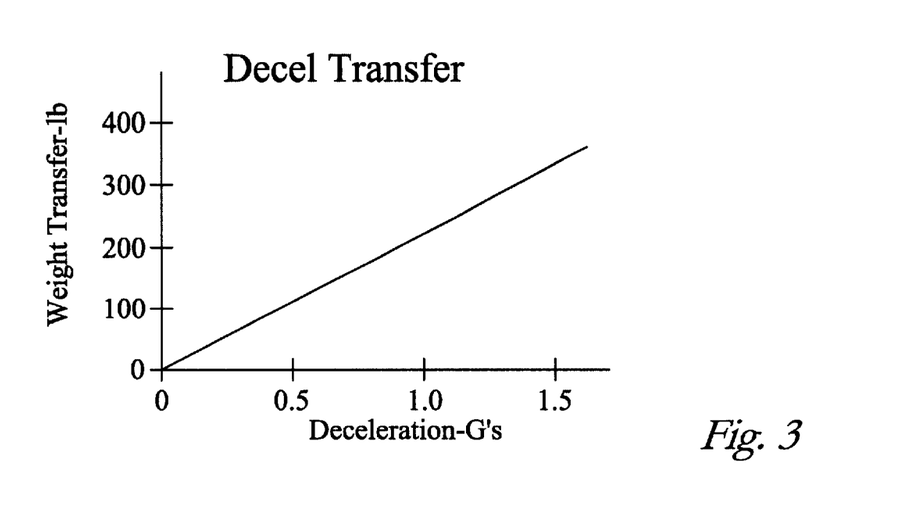
FIG. 3 is a graph illustrating axial deceleration "g" force.
Figure 4:
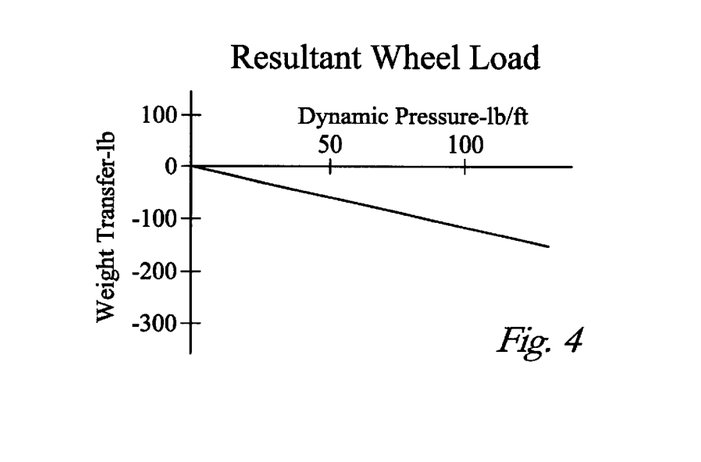
FIG. 4 is a graph illustrating aerodynamic pressure loading.

Referring to FIGS. 2, 3, and 4, respectively, load (vehicle weight) distribution between wheels varies in response to two parameters, axial deceleration "g" force and aerodynamic pressure loading. Deceleration tends to increase weight transfer to the front wheel, since the center of gravity resides approximately 24 inches above the braking forces which are applied at ground level. The couple produced tends to push the front wheel into the pavement, giving it more traction and tends to lift loading from the rear wheel, reducing its traction.

Aerodynamic drag has the reverse effect. Center of pressure resides near the cross sectional area centroid, approximately 27 inches above the road, producing a counter couple that increases with the square of vehicle velocity. Both couples and therefore net wheel loading, are quantifiable. Ideal braking effort distribution can then be determined by analysis as a function of deceleration rate and vehicle velocity.

Referring again to FIG. 1, proportioning valve 11 placed in the brake lines (10) of both wheels is configured to redistribute the (average) pressure applied from a common dual master cylinder 4 between front 8 and rear 6 brake calipers.

The brake pressure proportioning valve 11 mechanism modifies the braking effort applied to each wheel, its operation being evident from the schematic of FIG. 1. If the valve 11 were not present, the system reverts to a conventional hydraulic brake system that employs a dual master cylinder 4.

The dual master cylinder 4 applies pressure to each brake caliper, 6 and 8, through hydraulic lines 10. If sized for a nominal ½ g deceleration rate, the average pressure might be applied at 65% front to 35% rear brake force distribution, determined by master and brake cylinder areas. Without external input, valve 11 can perform as a preset proportioning valve to provide a given nominal distribution between front and rear brakes. Without the active portion of valve 11, the preset valve would provide for a single front to rear braking distribution. The active proportioning valve 11 varies the distribution from a nominal preset distribution pressure in response to input signals from the servos 12 and/or 14. Proportioning valve 11 can provide active braking distribution with inputs from deceleration servo 12 and/or air velocity servo 14 individually. However, combined inputs are preferred.

Aerodynamic pressure collected from an aperture or pitot tube at the front of the motorcycle fairing is routed by hose 15 to the air velocity servo mechanism 14 consisting of a large (rolling) diaphragm and small piston that in turn applies hydraulic pressure on a larger piston, the hydraulic intensify section 17. The force output of the large piston moves a balance piston within valve 11, nominally centered by springs or other biasing device. As the latter piston moves to the left in FIG. 1, it increases pressure to the rear caliper, reducing pressure to the front caliper simultaneously.

The balance piston in valve 11 can also receive an input from the deceleration servo 12. The deceleration servo 12 is a force amplification lever equipped with a mass that can pivot forward in response to braking g loads. The force input to the balance piston moves it in a direction opposite of that of aerodynamic pressure, to apply more brake line pressure to the front caliper, relieving pressure to the rear brake. Thus, if elements are correctly sized, the brake pressure applied to each caliper is appropriate to instant wheel loading due to net weight transfer. The opposing aero and deceleration forces on the vehicle with brakes applied are used to distribute the braking effort for most efficient stopping power.

Actuation of the master cylinder 4 can be applied by rider hand or foot control, or both (determined by design). Pressure distribution is in direct response to the two signals (deceleration and velocity pressure), or alternately from one signal, or to a preset distribution with no external signal inputs. Sizing of the brake elements, proportioning valve 11 and signal generators or servos 12 and 14 is a matter of design.

Figure 5:
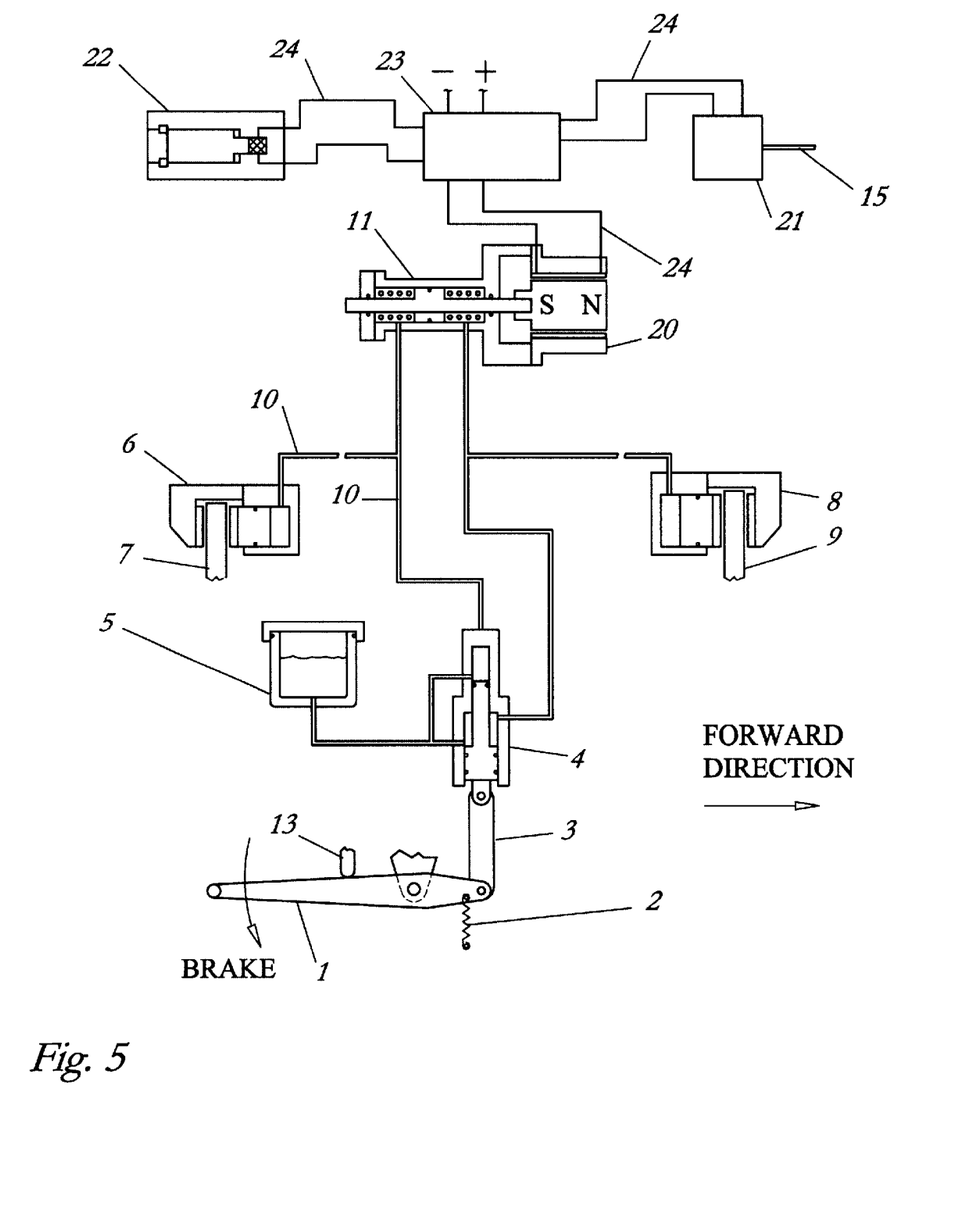
FIG. 5 is a diagrammatic view of an alternate embodiment of the brake system of the present invention.

Referring to FIG. 5, an alternate embodiment of the proportional brake system is illustrated. Components identical to the components illustrated in FIG. 1 have the same reference numerals.

FIG. 1 illustrates a hydro-pneumatic and mechanical implementation of the proportional braking system. In the embodiment illustrated in FIG. 5, the position of the balance piston within brake proportioning valve 11 is controlled by use of an electrical actuator 20, such as an electrical solenoid. Aerodynamic pressure is measured by use of a pressure transducer 21. Deceleration g force is measured by an accelerometer 22. Both generate electrical signals fed to a controller 23. The controller 23 amplifies each signal, and determines the appropriate force in either direction to be applied by the actuator 20, based on signal difference. An electrical current is fed to the actuator 20 by the controller 23 to modify respective brake pressure to apply braking effort proportional to instant wheel loading at the pavement. Electrical components are interconnected by suitable electrical wires 24.

A second pressure transducer 102 senses brake pressure and is connected by wires 24 to the controller 23. Transducer 102 functions as a lockout valve in that the brake hydraulic pressure signal enables the controller 23 to operate the acuator 20. The actuator 20 remains passive until brake pressure is applied. This prevents back flow of brake fluid through fill ports in master cylinder 4. Application of brake lever 1 closes said ports simultaneous with the brake pressure signal to transducer 102.

Use of the hereinabove described proportioning brake system permits dramatic reduction in stopping distance that is near transparent to the rider. No special rider skill or knowledge regarding the degree of braking effort that should be applied to each wheel (before traction is lost at one wheel) is needed. Conventional motorcycle brake systems require the rider to apply braking with separate levers (one hand, one foot) to each wheel. The rider must determine the proper amount of pressure to be applied individually to each wheel based upon the current conditions. To some degree, the rider skill at a particular instant in time, determines the minimum stopping distance for the motorcycle.

Figure 6:
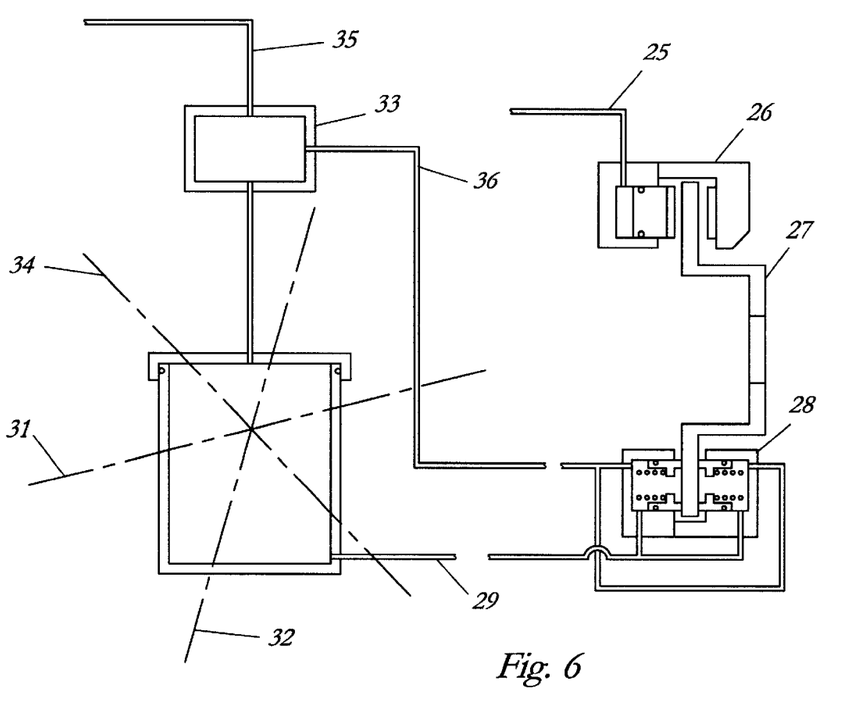
FIG. 6 is a diagrammatic view of the liquid brake cooling system of the present invention.

Referring to FIG. 6, liquid cooling of the front disk is employed to augment convective air cooling. Liquid cooling will, when braking is applied, more rapidly dissipate the frictional heating of the brake disk and the pads gripping the disk to effectively eliminate brake "fade". Fade is a phenomena caused by overheating of the pads, which severely reduces friction coefficient of the pad material. The loss of friction dramatically reduces stopping performance.

The embodiment shown in FIG. 6 routes liquid from a reservoir 30 through a hose 29 to a disk cooling unit 28 which contains chambers on either side of the brake disk rotor 27. Each chamber of cooling unit 28 is equipped with spring loaded seals contacting the disk to prevent liquid escape. Braking is applied through hydraulic line 25 to caliper/pads 26, in conventional manner. Liquid surges forward from reservoir 30 to each chamber as a result of vehicle deceleration, and is heated by the disk 27 until it boils. The steam generated is exhausted overboard through a cooling vent hose 36 attached at the top of the disk cooling unit 28. A catch tank 33, with overboard vent 35, can be added to catch liquid condensate for reuse by the system.

It is preferred that reservoir 30 be sized such that the liquid level surface covers the liquid exit port into hose 29 during various acceleration and deceleration forces, as illustrated by surface attitude in FIG. 6 at 0.25 g deceleration 31, at 2.0 g deceleration 32, and at 1.0 g acceleration 34.

By virtue of reducing brake temperature, liquid cooling permits the use of aluminum disk material. Aluminum is desirable because of its lower mass density than iron or steel, and because its high conductivity reduces thermal gradient in the disk. Aluminum disk material would require hard facing to prevent excessive wear.

Figure 7:
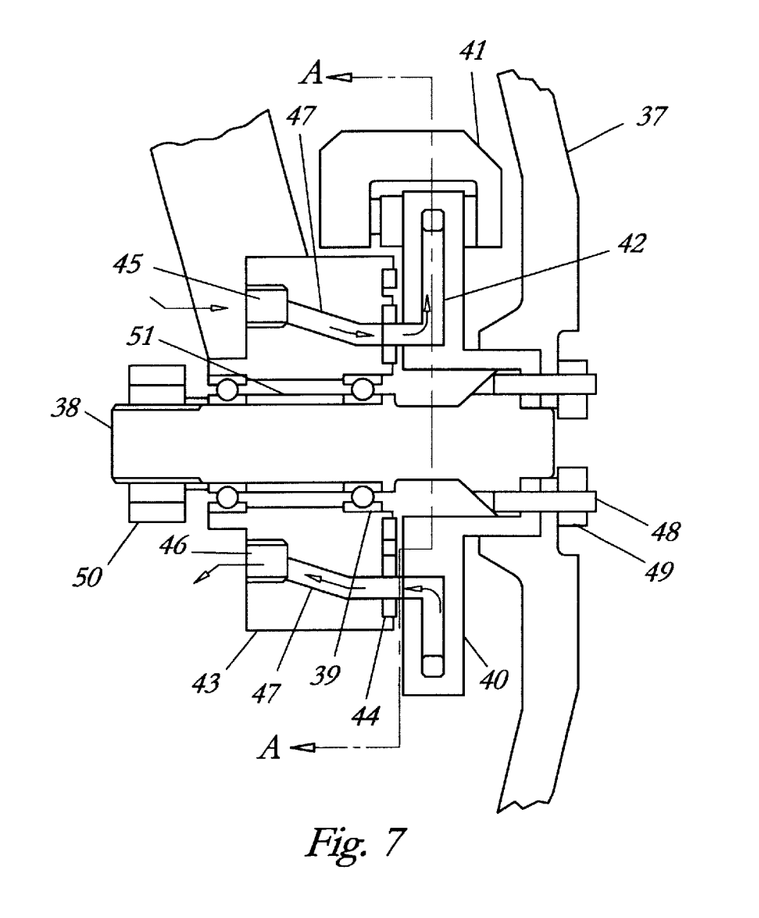
FIG. 7 is a side elevational view of an alternate embodiment of the liquid brake cooling system.

Referring to FIG. 7, an alternative brake liquid cooling system is illustrated, which depicts a closed-loop recirculating system. FIG. 6 illustrates a total-loss system, where the liquid contained in its reservoir is eventually dissipated and must be refilled. The recirculating system of the embodiment of FIG. 7, utilizes a remote radiator, pump and hose (not shown) to cool and replenish the heated liquid circulating through the brake disk.

Figure 8:
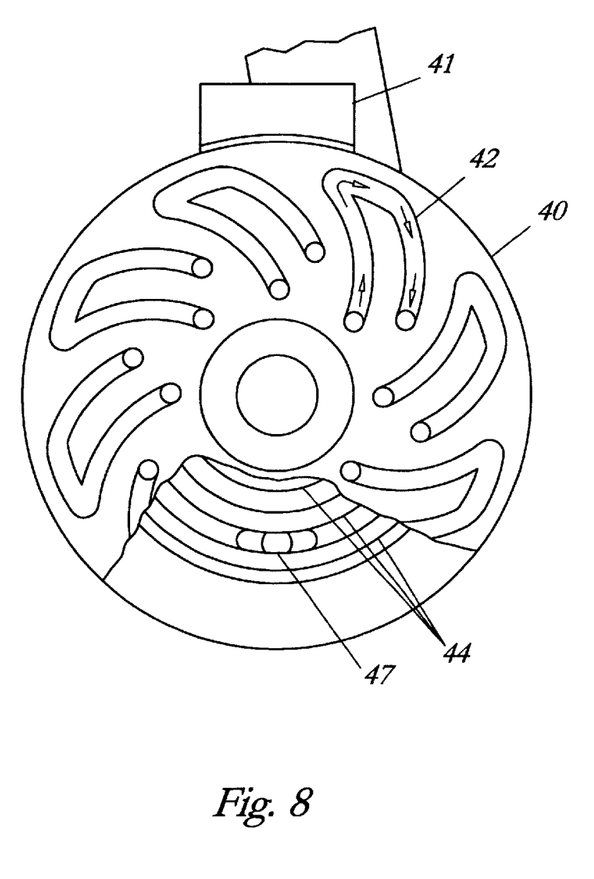
FIG. 8 is a cross-sectional view taken along line A—A in FIG. 7.

Wheel 37 is mounted on axle 38 by studs 48 and nuts 49, and includes wheel bearings 39, axle nut 50 and bearing spacer 51. Braking occurs by brake caliper and pads 41 compressing on brake disk rotor 40.

A fixed volume of cooling liquid is contained in the system, which (by design) is not permitted to boil. Cool liquid is fed into the upright at the inlet port 45, and is routed through upright member 43 by passage 47 to an annular space between the two seals 44 where it splits into multiple channels 42 in the brake disk 40 through holes that align with the annular space. The cooling channels 42 spiral in to a set of holes that align with a second annular space between two seals 44. The channels 42 can be formed by casting in the disk. An involute channel path is preferred to maximize heat transfer area in the disk 40 for efficient cooling at a given liquid flow rate. Heated liquid exits through a second passage 47 to the discharge port 46 and is subsequently delivered to the radiator for cooling before it is returned by the pump. The radiator and pump are conventional and not shown.

The above description assumes a dedicated pump, radiator, and hoses to service the brake heated liquid. However, the pump and radiator used for engine cooling could be employed to supply the brake cooling, if adequately sized, using parallel cooling circuits. Cooling of the engine and brake system fluids together would reduce the number of components required.

Referring to FIGS. 9 through 13, the bodywork fairing 55 encloses much of the functional motorcycle components to smooth the external air flow path when in forward motion. The fairing is also shaped to hide most of the rider's body in a racing crouch, when viewed from the front, FIG. 11.

The fairing 55 includes the following features: inlet aperture 56, wind screen 57, hand enclosure tunnels 58, handlebar 59, tail piece 60, louvers 61, porous screens 62, knee notches 63, fuel tank 64, foot peg 65, radiator 66, main air flow path 67, engine air intake path 68, wind screen boundary layer air flow path 69, slots 70, plenum 71, warm air discharge 72, bypass air flow path 73, and rear wheel well 74.

Figure 9:
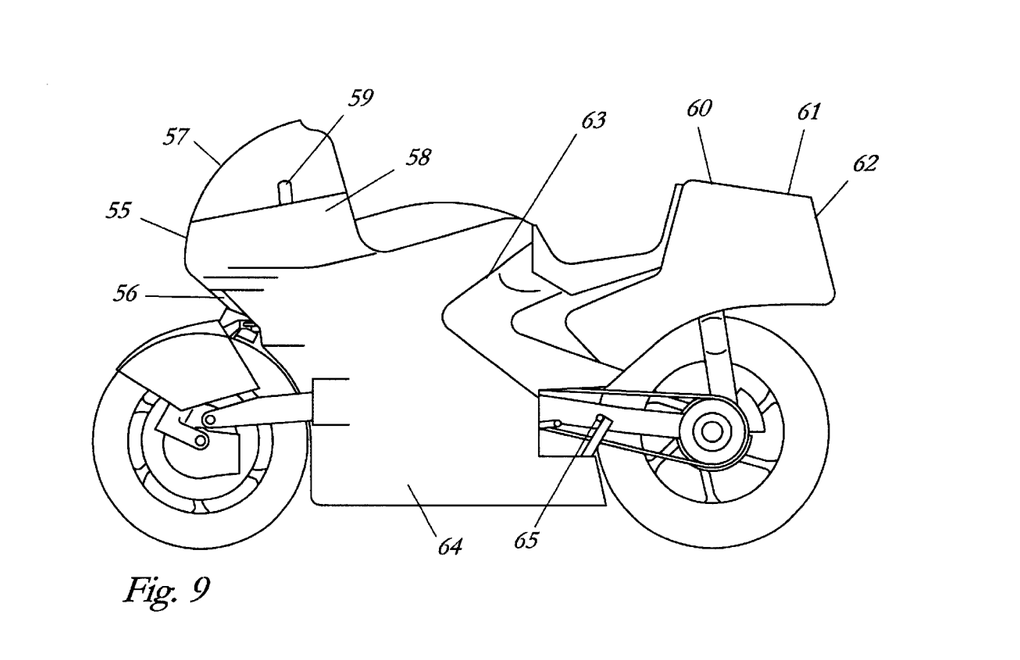
FIG. 9 is side elevational view of the bodywork of the present invention.
Figure 10:
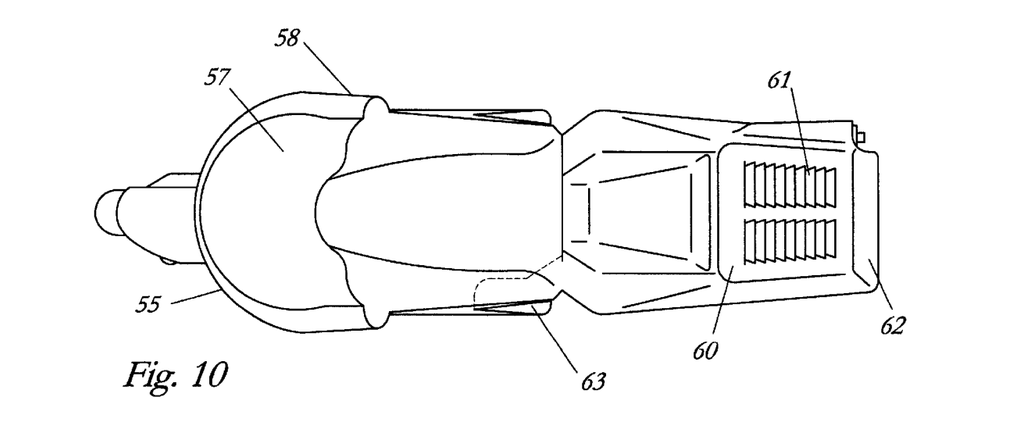
FIG. 10 is top plan view of the bodywork of FIG. 9.
Figure 11:
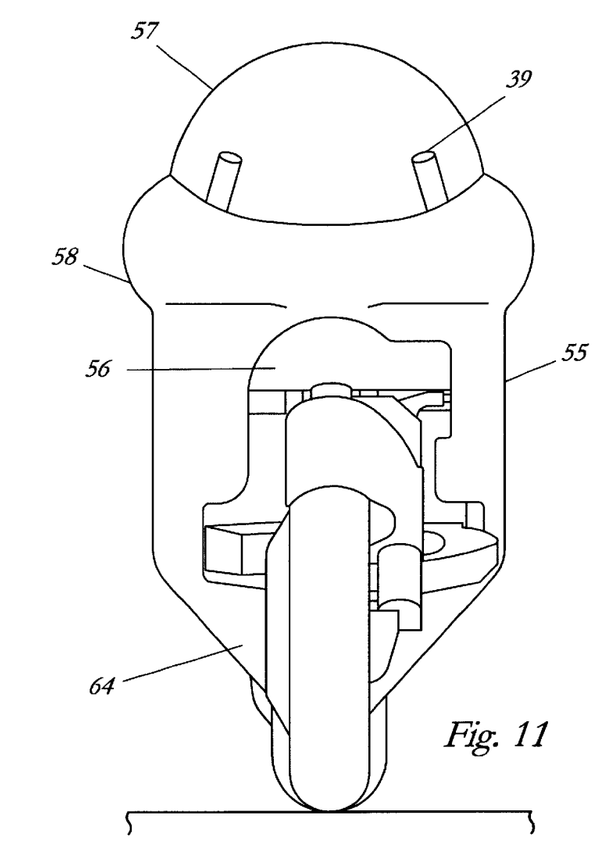
FIG. 11 is a front elevational view of the bodywork of FIG. 9.
Figure 12:
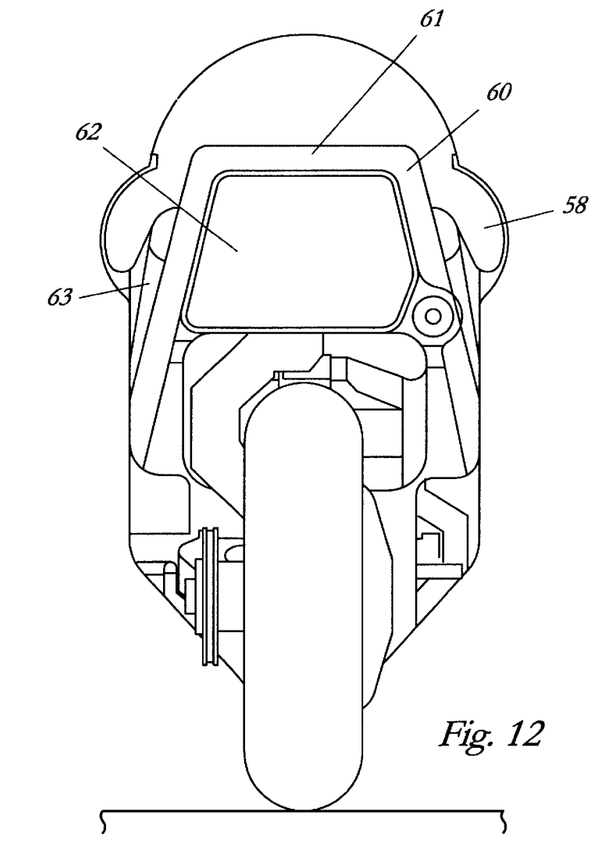
FIG. 12 is a rear elevational view of the bodywork of FIG. 9.

Deviation from conventional practice is first apparent in FIGS. 9 and 10 in that deep knee notches 63 are configured to conform to the rider's legs, such that the rider's legs are completely hidden in the front view, FIG. 11, and only the rider's feet are visible from the rear. Therefore, a greatly reduced air flow trip is presented by the rider's legs, for less aerodynamic drag.

A second and important function is served by the knee notch 63 geometry. The shape and structure of the notches 63 is designed to support the knee and upper thigh area of the rider against braking forces on the rider. The usual rider response is to grip the rear of the fuel tank by squeezing his knees together and to brace his arms, hands and shoulders against the handle bars. As braking deceleration can exceed 1.0 g, the rider must support more than his own weight in this fashion. It is apparent that additional passive support for the lower body offered by the knee notches potentially reduces rider fatigue.

Figure 13:
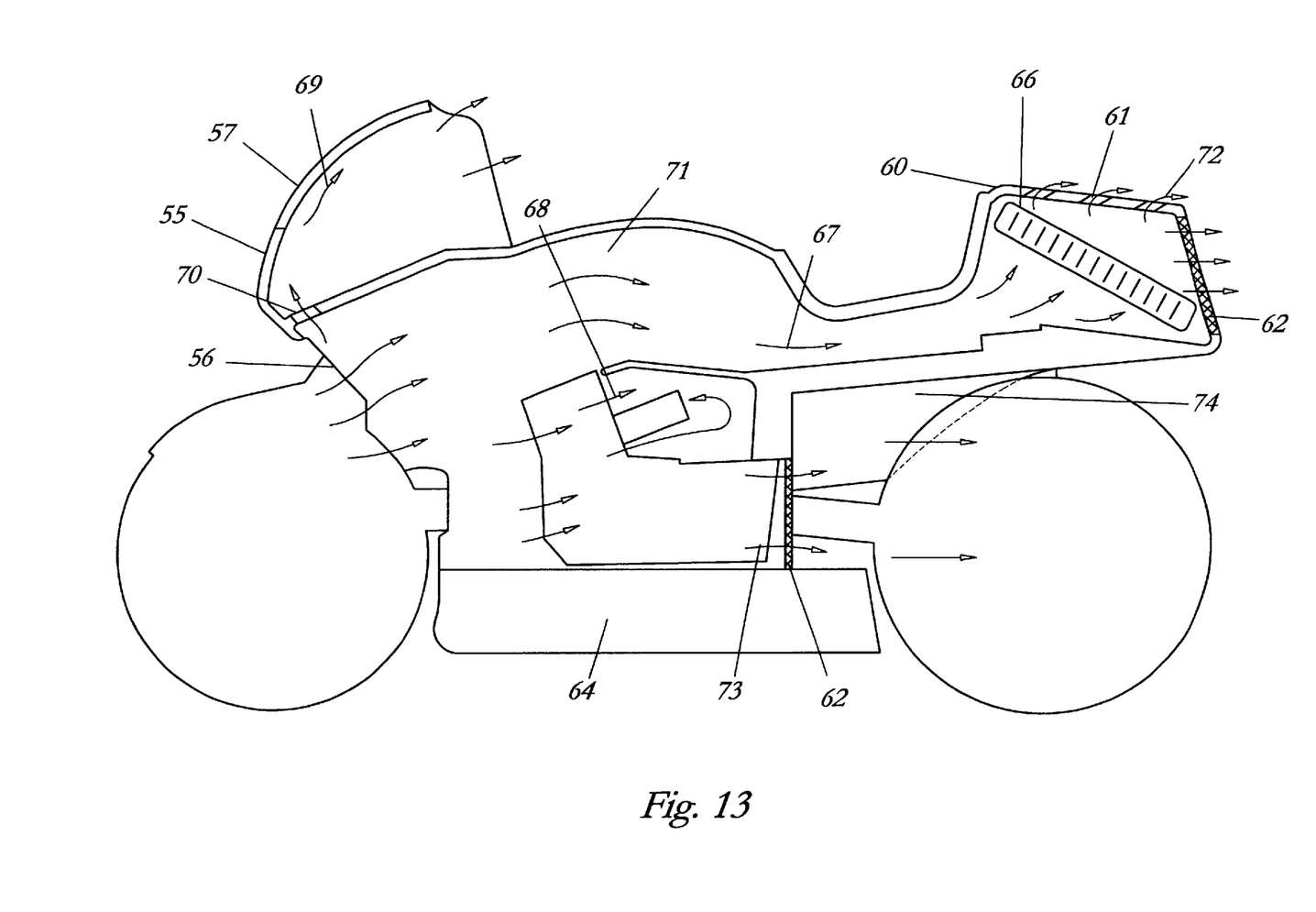
FIG. 13 is diagrammatic view of the internal air flow ducting of that of FIG. 9.

The unique arrangement of essential components allows improved management of internal flows. The bodywork configuration provides the ducting, discharges the cooling flow back into the main stream with aerodynamic efficiency, and also protects the rider from warm discharge air. An inlet aperture 56 centered in the front of the fairing 55 takes in cool air. Internal flow area 67 inside the fairing permits radiator cooling air to be routed over top of the engine, aft, below the rider's seat, into a box-like structure 60 behind the rider. Tail piece 60 contains the radiator 66, angled forward as illustrated in FIG. 13. The air passes through the radiator core into a volume behind and above it. This box-like tail piece 60 is equipped with rear facing vent louvers 72 on its top surface, and a porous screen 62 on its aft surface. This allows the warmed cooling air to re-enter the external flow stream in a low pressure region behind the rider with axial velocity.

Turbulence is minimized for reduced aerodynamic drag. Moreover, the rider is not exposed to the discomfort associated with warm radiator discharge 72 blowing on his/her body, as is the usual case with a forward mounted radiator. The internal air ducting illustrated in FIG. 13, is possible by relocation of the fuel tank 64 below the engine, and integral with the main frame. Although the plenum 71 above the engine contains a number of components, there is sufficient flow area for adequate cooling.

In addition to the main internal flow path 67, some fresh air is routed to the engine air intake 68. Also, some air is bled from the plenum 71 above the engine through slots 70 immediately behind the wind screen 57. This flow forms a low velocity boundary layer 69 flowing up and aft inside the wind screen to join with the external flow path at the aft edge of the screen. The main function of layer 69 is to isolate the rider from flow separation buffeting forces in the region of the rider's head. Slot size and quantity can be optimized by trial and error to minimize such buffeting and associated aerodynamic drag.

Some internally ducted air is allowed to bypass 73 around both sides of the engine to exit through the rear wheel well 74. A second porous screen 62 may be fitted in the forward part of the wheel well 74 to meter and distribute discharge flow. The bypass flow tends to reduce the velocity difference between flows passing inside and outside the rider's legs. This will reduce wake turbulence created by the lower half of the machine. The smaller wake reduces aerodynamic drag.

Another feature to protect the rider from aerodynamic forces is the hand enclosure tunnels 58 formed into the fairing 55. These are made practical by virtue of a steering (leverage) system that allows narrow handlebars without penalty to steering controllability. The fairing of hands and wrist should also reduce aerodynamic drag.

Complete enclosure of the engine exhaust system by the fairing also reduces aerodynamic drag. Waste heat from the exhaust is carried off by the lower velocity internally directed air flow, at less drag penalty. The internal flows are straightened to blend with the external flow path in the discharge region after being combined with radiator discharge flow 72 and or bypass flow 73.

Although separate ducting is indicated to separate radiator cooling flow 67, engine intake flow 68, and bypass flow paths 73, in practice they may not require separation. The internal flow division may be allowed to seek its own distribution, metered only by the area and flow coefficient assigned to each porous screen 62 at the exit. These are selected by design, and may be adjusted by experimental procedures to optimize the cooling and aerodynamic drag compromise, as needed.

Figure 14:
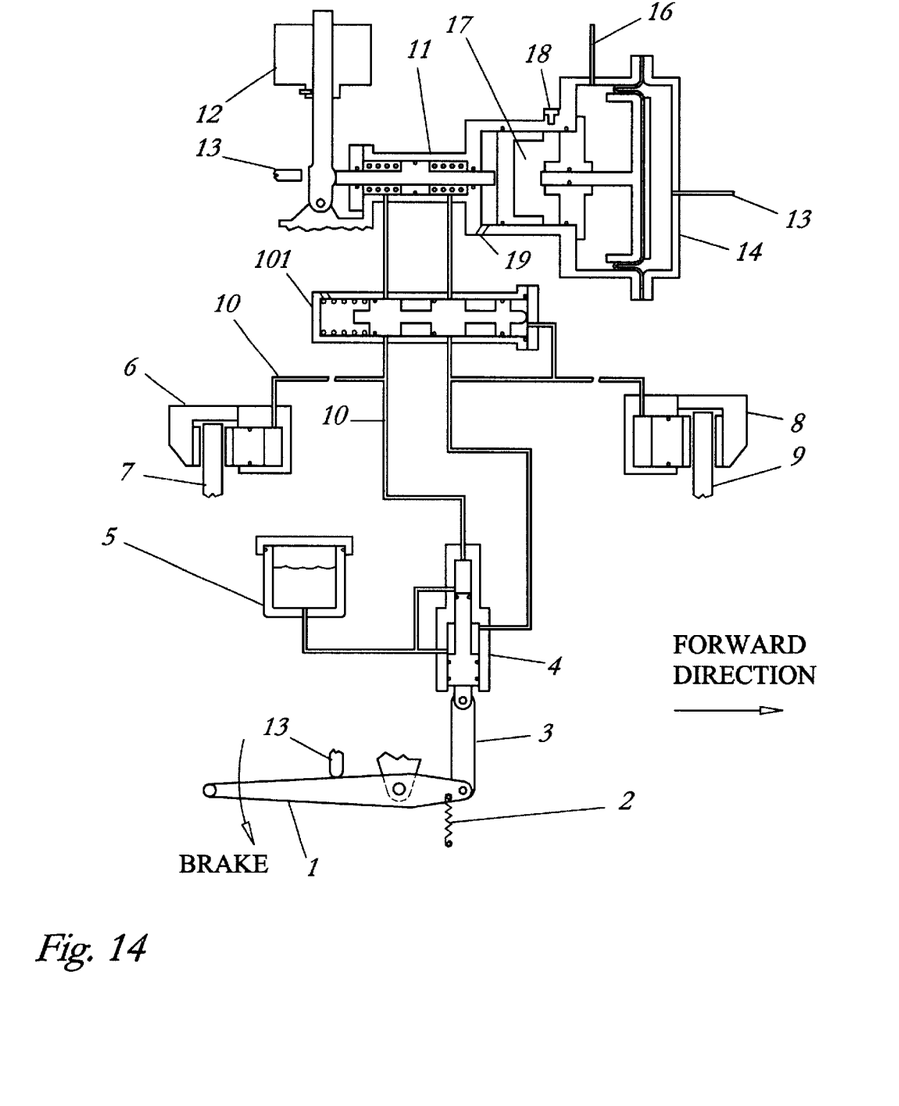
FIG. 14 is a lockout valve for the braking system.
Figure 15:
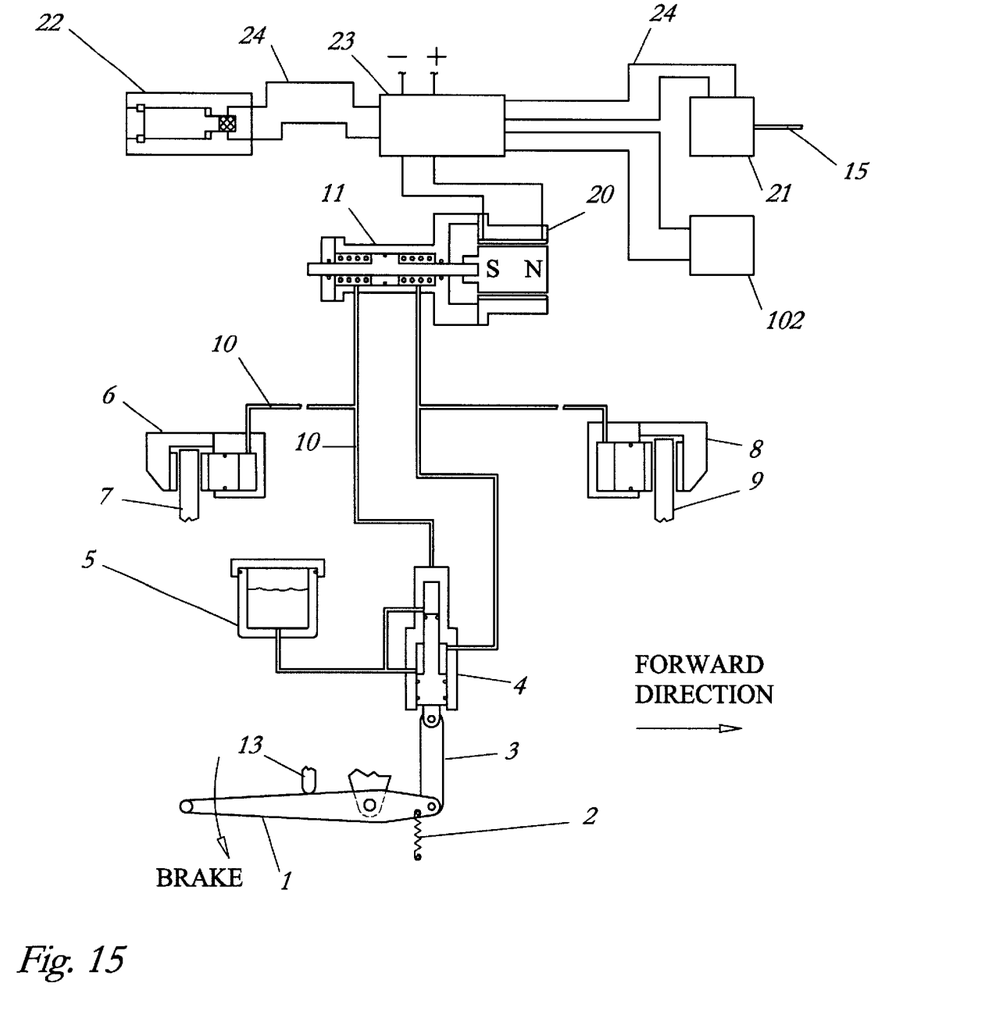
FIG. 15 is an alternative embodiment for a lockout valve.

FIG. 14 and FIG. 15 illustrate a lockout valve to the braking system schematics. This is to prevent back-flowing the system into the master cylinder reservoir before brake pressure is applied.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A proportional braking system, comprising:
a proportioning valve hydraulically connected to at least one brake actuating lever and a brake master cylinder, said proportioning valve having means for adaptively variable distribution of hydraulic braking pressure between a front wheel brake and a rear wheel brake in response to instant dynamic characteristics of the vehicle and in response to actuation of said at least one brake lever.

2. The proportional braking system of claim 1 further including a deceleration servo mechanically connected to said proportioning valve, said means for distribution of hydraulic braking pressure responsive to an input from said deceleration servo, said distribution of hydraulic braking pressure between said front wheel brake and said rear wheel brake being at least partially determined by said input.

3. The proportional braking system of claim 2 wherein the means for distribution of hydraulic braking pressure further includes a lockout valve to prevent displacement of brake fluid prior to the application of brake pressure.

4. The proportional braking system of claim 1 further including an air velocity servo mechanically connected to said proportioning valve, said means for distribution of hydraulic braking pressure responsive to an input from said air velocity servo, said distribution of hydraulic braking pressure between said front wheel brake and said rear wheel brake being at least partially determined by said input.

5. The proportional braking system of claim 4 wherein the means for distribution of hydraulic braking pressure further includes a lockout valve to prevent displacement of brake fluid prior to the application of brake pressure.

6. The proportional braking system of claim 1 further including a deceleration servo and an air velocity servo mechanically connected to said proportioning valve, said means for distribution of hydraulic braking pressure responsive to a first input from said deceleration servo and a second input from said air velocity servo, said distribution of hydraulic braking pressure between said front wheel brake and said rear wheel brake being at least partially determined by said first input and said second input.

7. The proportional braking system of claim 6 wherein the means for distribution of hydraulic braking pressure further includes a lockout valve to prevent displacement of brake fluid prior to the application of brake pressure.

8. The proportional braking system of claim 1 further including an accelerometer electrically connected to a controller and to said proportioning valve, said means for distribution of hydraulic braking pressure responsive to an input from said accelerometer, said distribution of hydraulic braking pressure between at least two brakes comprising said front wheel brake and said rear wheel brake being at least partially determined by said input.

9. The proportional braking system of claim 8 wherein the means for distribution of hydraulic braking pressure further includes a lockout valve to prevent displacement of brake fluid prior to the application of brake pressure.

10. The proportional braking system of claim 1 further including a pressure transducer electrically connected to a controller and to said proportioning valve, said means for distribution of hydraulic braking pressure responsive to an input from said pressure transducer, said distribution of hydraulic braking pressure between at least two brakes comprising said front wheel brake and said rear wheel brake being at least partially determined by said input.

11. The proportional braking system of claim 10 wherein the means for distribution of hydraulic braking pressure further includes a lockout valve to prevent displacement of brake fluid prior to the application of brake pressure.

12. The proportional braking system of claim 1 further including an accelerometer and a pressure transducer connected to a controller and to said proportioning valve, said means for distribution of hydraulic braking pressure responsive to a first input from said accelerometer and a second input from said pressure transducer, said distribution of hydraulic braking pressure between at least two brakes comprising said front wheel brake and said rear wheel brake being at least partially determined by said first input and said second input.

13. The proportional braking system of claim 12 wherein the means for distribution of hydraulic braking pressure further includes a lockout valve to prevent displacement of brake fluid prior to the application of brake pressure.

14. The proportional braking system of claim 1 further including a motorcycle fairing having a left knee notch and a right knee notch adapted to retain a rider's left and right legs, respectively, within a reduced aerodynamic drag area, and to provide a bracing support for the rider against deceleration forces caused by the proportional braking system.

15. A liquid cooling system for brakes, comprising:
a disk cooling housing having at least one cooling chamber connected adjacent a brake disk rotor and including means for sealably retaining a cooling liquid within said chamber in contact with said brake disk rotor to transfer heat from said brake disk rotor to said cooling liquid during braking, wherein said cooling liquid is heated by said brake disk rotor until said cooling liquid boils into vapor which is released.

16. The liquid cooling system of claim 15, further including means for venting said vapor away from a rider.

17. The liquid cooling system of claim 16 wherein said means for venting vapor includes a condensate housing for cooling said vapor, converting said vapor back into said cooling liquid, and returning said liquid to a cooling liquid reservoir connected to said disk cooling housing.

18. A liquid cooling system for motorcycle brakes, comprising:
a brake disk rotor having at least one closed cooling channel integrally disposed within said brake disk rotor, said at least one channel in fluid communication with an inlet port and an outlet port through a face-type seal positioned adjacent said brake disk rotor for passage of cooling liquid through said at least one cooling channel to transfer heat from said brake disk rotor to said cooling liquid during braking.

19. The liquid cooling system of claim 18 further including a plurality of closed cooling channels integrally disposed within said brake disk rotor.

20. The liquid cooling system of claim 18 further including a radiator for cooling of said cooling liquid, and a pump for pumping said cooling liquid through said passage and said at least one closed cooling channel.

21. A proportional braking and liquid cooled brake system, comprising:
a proportioning valve hydraulically connected to at least one brake actuating lever and a brake master cylinder, said proportioning valve having means for distribution of hydraulic braking pressure between a front wheel brake and a rear wheel brake according to a preselected distribution of hydraulic braking pressure in response to actuation of said at least one brake lever; and,
a disk cooling housing having at least one cooling chamber connected adjacent a brake disk rotor and including means for sealably retaining a cooling liquid within said chamber in close proximity to said brake disk rotor to transfer heat from said brake disk rotor to said cooling liquid during braking.

22. The brake system of claim 21 further including a deceleration servo and an air velocity servo connected to said proportioning valve, said means for distribution of hydraulic braking pressure responsive to a first input from said deceleration servo and a second input from said air velocity servo, said distribution of hydraulic braking pressure between said front wheel brake and said rear wheel brake being at least partially determined by said first input and said second input.

23. The brake system of claim 21 further including an accelerometer and a pressure transducer connected to a controller and to said proportioning valve, said means for distribution of hydraulic braking pressure responsive to a first input from said accelerometer and a second input from said pressure transducer, said distribution of hydraulic braking pressure between said front wheel brake and said rear wheel brake being at least partially determined by said first input and said second input.

24. The brake system of claim 21 further including a motorcycle fairing having a left knee notch and a right knee notch adapted to retain a rider's left and right legs, respectively, within a reduced aerodynamic drag area, and to provide a bracing support for the rider against deceleration forces.

25. The brake system of claim 21 wherein said cooling liquid heats to the boiling point and converts to a vapor during braking, and further including means for venting said vapor away from a rider.

26. The brake system of claim 25 wherein said means for venting includes a condensate housing for cooling said vapor, converting said vapor back into said cooling liquid, and returning said liquid to a cooling liquid reservoir connected to said disk cooling housing.

27. A proportional braking and liquid cooled brake system, comprising:
- a proportioning valve hydraulically connected to at least one brake actuating lever and a brake master cylinder, said proportioning valve having means for distribution of hydraulic braking pressure between a front wheel brake and a rear wheel brake according to a preselected distribution of hydraulic braking pressure in response to actuation of said at least one brake lever; and,
- a brake disk rotor having at least one cooling channel disposed within said brake disk rotor, said at least one channel in fluid communication with an inlet port and an outlet port positioned adjacent said brake disk rotor, a cooling liquid passage communicating with said inlet port and said outlet port for passage of cooling liquid through said at least one cooling channel to transfer heat from said brake disk rotor to said cooling liquid during braking.

28. The brake system of claim 27 further including a deceleration servo and an air velocity servo connected to said proportioning valve, said means for distribution of hydraulic braking pressure responsive to a first input from said deceleration servo and a second input from said air velocity servo, said distribution of hydraulic braking pressure between said front wheel brake and said rear wheel brake being at least partially determined by said first input and said second input.

29. The brake system of claim 27 further including an accelerometer and a pressure transducer connected to a controller and to said proportioning valve, said means for distribution of hydraulic braking pressure responsive to a first input from said accelerometer and a second input from said pressure transducer, said distribution of hydraulic braking pressure between said front wheel brake and said rear wheel brake being at least partially determined by said first input and said second input.

30. The brake system of claim 27 further including a motorcycle fairing having a left knee notch and a right knee notch adapted to retain a rider's left and right legs, respectively, within a reduced aerodynamic drag area, and to provide a bracing support for the rider against deceleration forces.

31. The brake system of claim 27 further including a plurality of cooling channels disposed within said brake disk rotor.

32. The brake system of claim 27 further including a radiator for cooling of said cooling liquid, and a pump for pumping said cooling liquid through said passage and said at least one cooling channel.

33. A proportional braking and liquid cooled brake system, comprising:
- a proportioning valve hydraulically connected to at least one brake actuating lever and a brake master cylinder, said proportioning valve having means for adaptively variable distribution of hydraulic braking pressure between a front wheel brake and a rear wheel brake in response to instant dynamic characteristics of the vehicle and in response to actuation of said at least one brake lever; and,
- a disk cooling housing having at least one cooling chamber connected adjacent a brake disk rotor and including means for sealably retaining a cooling liquid within said chamber in contact with said brake disk rotor to transfer heat from said brake disk rotor to said cooling liquid during braking.

34. A proportional braking and liquid cooled brake system, comprising:
- a proportioning valve hydraulically connected to at least one brake actuating lever and a brake master cylinder, said proportioning valve having means for distribution of hydraulic braking pressure between a front wheel brake and a rear wheel brake according to an actively variable distribution of hydraulic braking pressure in response to actuation of at least one brake lever; and,
- a brake disk rotor having at least one closed cooling channel integrally disposed within said brake disk rotor, said at least one channel in fluid communication with an inlet port and an outlet port through a face-type seal positioned adjacent said brake disk rotor, a cooling liquid passage communicating with said inlet port and said outlet port for passage of cooling liquid through said at least one cooling channel to transfer heat from said brake disk rotor to said cooling liquid during braking.

* * * * *